United States Patent
Liu et al.

(10) Patent No.: US 9,980,297 B2
(45) Date of Patent: May 22, 2018

(54) METHOD AND DEVICE FOR EMERGENCY HANDLING IN COMMUNICATION NETWORK

(71) Applicant: TELEFONAKTIEBOLAGET LM ERICSSON (PUBL), Stockholm (SE)

(72) Inventors: Di Liu, Shanghai (CN); Mei Dong, Shanghai (CN); Feng Guo, Shanghai (CN); Jingzhe Zhang, Shanghai (CN); Nan Zhang, Göteborg (SE); Min Zhu, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days. days.

(21) Appl. No.: 15/025,782

(22) PCT Filed: Sep. 29, 2013

(86) PCT No.: PCT/CN2013/084562
§ 371 (c)(1),
(2) Date: Mar. 29, 2016

(87) PCT Pub. No.: WO2015/042899
PCT Pub. Date: Apr. 2, 2015

(65) Prior Publication Data
US 2016/0249388 A1 Aug. 25, 2016

(51) Int. Cl.
*H04W 76/00* (2018.01)
*H04W 4/22* (2009.01)
(Continued)

(52) U.S. Cl.
CPC ....... *H04W 76/007* (2013.01); *H04L 47/6215* (2013.01); *H04W 4/22* (2013.01);
(Continued)

(58) Field of Classification Search
CPC ..... H04W 4/22; H04W 76/007; H04W 72/10; H04W 28/08; H04W 48/02; H04W 48/08;
(Continued)

(56) References Cited

U.S. PATENT DOCUMENTS

2007/0021097 A1* 1/2007 Gaeta .................... H04W 48/04
455/404.1
2008/0102853 A1 5/2008 Kagimoto et al.
(Continued)

FOREIGN PATENT DOCUMENTS

CN 101079743 A 11/2007
CN 101730035 A 6/2010
(Continued)

OTHER PUBLICATIONS

International Search Report and Written Opinion dated Jul. 24, 2014, in International Application No. PCT/CN2013/084562, 11 pages.
(Continued)

*Primary Examiner* — Thai Vu
(74) *Attorney, Agent, or Firm* — Rothwell, Figg, Ernst & Manbeck, P.C.

(57) ABSTRACT

This disclosure provides an emergency handling method, comprising: receiving, by an emergency support function (ESF) entity, an emergency indicator indicating an emergency event from a network application server; handling the emergency indictor to derive related parameters including impacted network elements in a network; and triggering the impacted network elements to switch into a network emergency mode by sending an emergency command based on the related parameters. An emergency handling apparatus in a network is also provided. This improves efficiency of emergency handling in a network.

23 Claims, 5 Drawing Sheets

(51) Int. Cl.
*H04L 12/863* (2013.01)
*H04W 88/18* (2009.01)
*H04W 4/02* (2018.01)
*H04W 88/06* (2009.01)
*H04W 88/08* (2009.01)

(52) U.S. Cl.
CPC .............. *H04W 4/02* (2013.01); *H04W 88/06* (2013.01); *H04W 88/08* (2013.01); *H04W 88/18* (2013.01)

(58) Field of Classification Search
CPC ....... H04W 4/02; H04W 88/06; H04W 88/18; H04M 2242/04; H04M 3/5116; H04H 20/59; H04L 47/6215
USPC ............................................ 455/404.1, 404.2
See application file for complete search history.

(56) References Cited

U.S. PATENT DOCUMENTS

| | | | | |
|---|---|---|---|---|
| 2009/0239554 A1* | 9/2009 | Sammour | ............... | H04W 4/22 455/458 |
| 2010/0074130 A1* | 3/2010 | Bertrand | ............... | H04L 1/0007 370/252 |
| 2010/0248680 A1* | 9/2010 | Agulnik | ............... | H04W 74/006 455/404.2 |
| 2011/0270967 A1 | 11/2011 | Qiu et al. | | |
| 2012/0058796 A1* | 3/2012 | Miyabayashi | ........ | H04W 24/04 455/522 |
| 2012/0264428 A1 | 10/2012 | Lecompte et al. | | |
| 2012/0276933 A1* | 11/2012 | Laitinen | ............... | H04W 68/025 455/458 |
| 2013/0035134 A1* | 2/2013 | Suzuki | ................... | H04W 48/08 455/524 |
| 2013/0036175 A1* | 2/2013 | Lau | ....................... | G08B 27/001 709/206 |
| 2014/0024331 A1* | 1/2014 | Hsu | ....................... | H04W 36/28 455/404.1 |

FOREIGN PATENT DOCUMENTS

CN 101925180 A 12/2010
CN 102960024 A 3/2013

OTHER PUBLICATIONS

Extended European Search Report dated Feb. 10, 2017, issued in European Patent Application No. 13894505.0, 6 pages.
European Communication dated Jan. 15, 2018, issued in European Patent Application No. 13894505.0, 5 pages.

* cited by examiner

METHOD AND DEVICE FOR EMERGENCY HANDLING IN COMMUNICATION NETWORK

CROSS REFERENCE TO RELATED APPLICATION(S)

This application is a 35 U.S.C. § 371 National Phase Entry Application from PCT/CN2013/084562, filed Sep. 29, 2013, designating the United States, the disclosure of which is incorporated herein in its entirety by reference.

TECHNICAL FIELD

The invention generally relates to communication technologies, in particular to a method and a device for emergency handling in communication network.

BACKGROUND

The $3^{rd}$ Generation Partner Project (3GPP) had some discussion on emergency call, for example, IMS and SRVCC. Emergency is discussed in some 3gpp standards including, for example, TS 23.167 ("IP Multimedia Subsystem (IMS) emergency sessions"); TS 23.509 ("TISPAN; NGN Architecture to support emergency communication from citizen to authority"); TR 23.870 ("Single Radio Voice Call Continuity (SR-VCC) support for IMS Emergency Calls"), etc.

Conventionally, the emergency handling mentioned above mainly focuses on a UE level. Generally, UE-level emergency handling provides communication service to individual in emergency. While under emergency situation, the network traffic model is changing dramatically, as well as the urgency requirement on basic voice service, so how to optimize network resource to ensure basic voice service and avoid network overload become very important.

SUMMARY

Thus, an optimized solution is desired to handle above problem from the whole communication network point of view.

To the end, this disclosure introduces and develops an emergency network mode, and provides a method and a device for network-level emergency handling in the emergency situation. This will significantly enhance the handling efficiency in an emergency case. The enhanced method and device provided herein may preferably mitigate, alleviate or eliminate one or more of the above mentioned disadvantages singly or in any combination.

In one aspect of embodiments of the invention, there is provided an emergency handling method, comprising: receiving, by an emergency support function (ESF) entity, an emergency indicator indicating an emergency event from a network application server; handling the emergency indictor to derive related parameters including impacted network elements in a network; and triggering the impacted network elements to switch into a network emergency mode by sending an emergency command based on the related parameters.

In another aspect of embodiments of the invention, there is provided an emergency handling apparatus in a network, comprising: a receiving module for receiving an emergency indicator indicating an emergency event from a network server; a handling module for handling the emergency indictor to derive related parameters including impacted network elements in a network; and a distributing module for triggering the impacted network elements to switch into a network emergency mode by sending an emergency command based on the related parameters.

In yet another aspect of embodiments of the invention, there is provided a device comprising an emergency support function, ESF, entity performing any method of the embodiments of the present invention.

According to the embodiments of the invention, the whole network may take real time action and communication network behavior is adjusted when public emergency events happened. The action may be predefined and thus may increase the access and basic service capacity, which is very vital to the users and to Operator in an emergency.

According to the embodiments, an emergency network mode may be triggered by a $3^{rd}$ Party or an Operation Support System (OSS). All or partial NEs within a network may adjust parameter, including UE QoS policy simultaneously without individual UE level signaling interactions. This may save lots of time and signaling exchange in emergency case. Further, all or partial standard message procedure may be simplified, for example, all or partial Call Data Record (CDR) may be deactivated to save network resource and thus provide larger capability. These improve efficiency of emergency handling in a network.

BRIEF DESCRIPTION OF THE DRAWINGS

The features and advantages of the present invention will be more apparent from the following exemplary embodiments illustrated with reference to the accompanied drawings, in which.

DETAILED DESCRIPTION

The embodiments will be described thoroughly hereinafter with reference to the accompanied drawings. It will be apparent to those skilled in the art that the disclosure may, however, be implemented in many different forms and should not be construed as being limited to the specific details set forth in the given embodiments. Like numbers refer to like elements throughout the description.

In this disclosure, although specific terminologies have been used to exemplify the embodiments, this should not be seen as limiting the scope of the embodiments to only the aforementioned communication system. With the rapid development in communications, there will of course also be future type of technologies and systems with which the present invention may be adapted.

The disclosure may be described in detail from the following aspects hereinafter: the network emergency mode triggered by an OSS or an authorized $3^{rd}$ party, and the network behavior in the network emergency mode.

Figure 1:
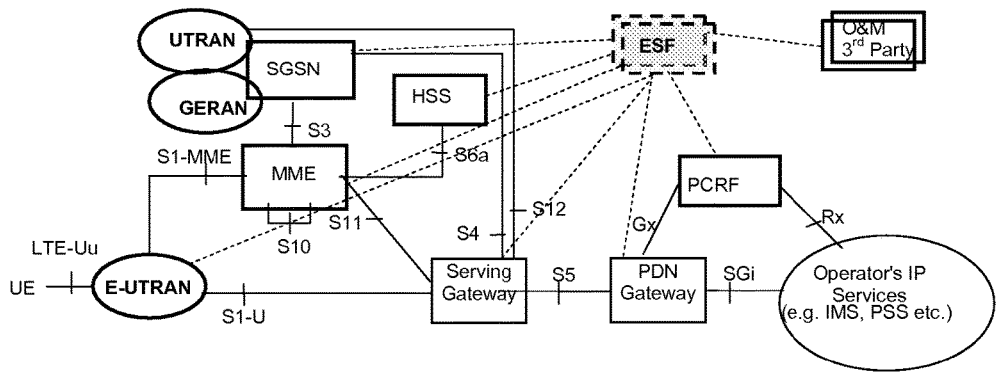
FIG. 1 illustrates an exemplary schematic flowchart of a network scenario including an Emergency Support Function (ESF) entity according to an embodiment of the invention.

FIG. 1 illustrates an exemplary schematic flowchart of a network scenario including an Emergency Support Function (ESF) entity according to an embodiment of the invention.

In FIG. 1, the exemplary LTE communication network includes a variety of network elements, such as, a Serving GPRS Support Node (SGSN), a Mobility Management Entity (MME), E-UTRAN, Serving Gateway, a Packet Data Network (PDN) Gateway, a Policy and Charging Rule Function (PCRF), etc. Specifically, an Emergency Support Function (ESF) entity, communicatively connected with both the OSS or the authorized $3^{rd}$ party device and all those NEs, is provided in the network for example as a single node to trigger the network to switch into an Emergency Network Mode of the network.

In the context, the network emergency mode may refer to a special communication mode supported by all or partial NEs in the network for dealing with emergency.

The OSS device or the authorized $3^{rd}$ party device may be implemented as any computing device, such as a network application server, a mainframe, etc. In the context, the NEs may generally refer to various network node devices in different networks, not limited to the listed above. Generally, NEs do not include end user devices (e.g., mobiles).

Particularly, when received an emergency indicator from the Operation Support System (OSS) device or the pre-defined authorized $3^{rd}$ party device, the NEs in the network within the emergency area will be initiated by the Emergency Support Function (ESF) entity to switch into the emergency network mode, adjusting all parameters/policies for each UE groups within the emergency area to cope with the emergency. For example, the network may be adjusted immediately when an earthquake administrator server sends out the level of emergency, for the users located in the zone. In the context, the term "UE" generally refers to the wireless user equipment, including mobile phones and machine type communication device, etc.

The ESF entity may handle the emergency indicator (including emergency location, command type, emergency type, emergency level, special user list) sent from the OSS or the authorized $3^{rd}$ party device to derive all impacted network elements in the network and trigger these NEs to switch into the network emergency mode. Further, the ESF entity may also maintain all pre-defined emergency policy/parameters for all NEs, which will be sent to all NEs when the emergency indicator is received. Optionally, each NE may have local pre-defined emergency policy/parameter.

The ESF entity may be implemented as hardware or software which may be deployed in different modes. For example, the ESF entity may be implemented as a single node, or a set of program codes resided in the node. Alternatively, the ESF entity may be co-existed within all NEs (e.g., MME, GW, etc.). The ESF entity may also be separated into a client end and a server end, which may separately be deployed in different nodes. The ESF entity may include several instances in each mode for the purpose of High Availability (HA). For example, one ESF entity may be deployed with a backup. The switching between the active and backup need inform the OSS or $3^{rd}$ party. Virtual Router Redundancy Protocol (VRRP) is also another option.

Figure 2:
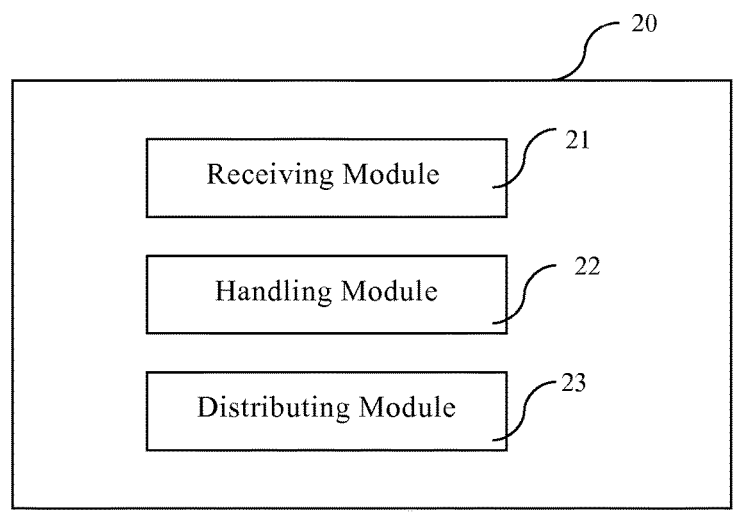
FIG. 2 illustrates a schematic block diagram of an emergency handling apparatus with an Emergency Support Function (ESF) entity according to an embodiment of the invention.

FIG. 2 illustrates a schematic block diagram of an Emergency Support Function (ESF) entity implemented as an emergency handling apparatus 20 according to an embodiment of the invention.

In the embodiment, the emergency handling apparatus 20 incorporated an Emergency Support Function (ESF) entity therein may include a receiving module 21, a handling module 22, and a distributing module 23.

The receiving module 21 may be configured to interface with the OSS device or the authorized $3^{rd}$ party device and receive an emergency indicator from a network server. The emergency indicator may be used to indicate an emergency occurs, which may include following information as shown in Table 1, such as, geographic location representing where emergency occurs, e.g., via latitude/longitude or administrative area; non-affected Access Point Name (APN); non-affected MSISDN/IMSI series; emergency type describing emergency caused by e.g. flood or earthquake; command type (e.g., Create, Delete, Modify) indicating respectively e.g. emergency occurring, emergency eliminated, emergency level changed; emergency level describing the severity level, e.g., level 1 refers to the highest level emergency; actions representing specific adjustment measures taken, e.g., decreasing QoS level, disabling Gx interface, etc.

The ESF entity may derive the impacted NE list, Cell ID, Tracking Area (TA), Location Area (LA), Routing Area (RA), etc. from the mapping tables based on the location information. The message sent from the ESF entity to each NE may contains the information e.g. Cell ID/TA/LA/RA.

TABLE 1

| index | Command type | location | Non-Affected APN | emergency type | Level | Action (e.g. QoS, GBR/MBR) | comments |
|---|---|---|---|---|---|---|---|
| 1 | Create | Geo1 | "IMS" APN | earthquake | 1 | Decrease to ⅓ (dedicated bearer for IMS voice can not be affected) | Highest level |
| 2 | Delete | Geo1 |  | earthquake | 1 | Resume | Highest level |

TABLE 1-continued

| Command index | type | location | Non-Affected APN | emergency type | Level | Action (e.g. QoS, GBR/MBR) | comments |
|---|---|---|---|---|---|---|---|
| 3 | Modify | Geo2 | "HOSPITAL" APN | Fire | 8 | Increase the priority of all/partial UE in the emergency zone, and/or decrease priority of other partial UE not in the emergency zone | |
| ... | | | | | | | |
| 19 | Create | Geo19 | "IMS" APN "BANK" APN "LIUDI" APN | preparation | 9 | Preparation for emergency, control high MBR/GBR user access | Lowest level |
| ... | | | | | | | |

The handling module 22 may be configured to handle the emergency indictor to derive, e.g., the impacted network elements in a network, emergency level, and other related parameters. Alternatively or additionally, the handling module 22 may further be configured to derive the impacted network elements based on geographic location information contained in the emergency indicator; and define different emergency configuration parameters for different network elements. The distributing module 23 may be configured to trigger the impacted network elements to switch into a network emergency mode by sending an emergency command to each of the impacted NEs based on the related parameters, such as the emergency level.

The emergency handling apparatus 20 may further include a configuration module which may configure all network element addresses in the apparatus 20. The address of the apparatus 20 may also be configured in all network elements in the network.

Figure 3:
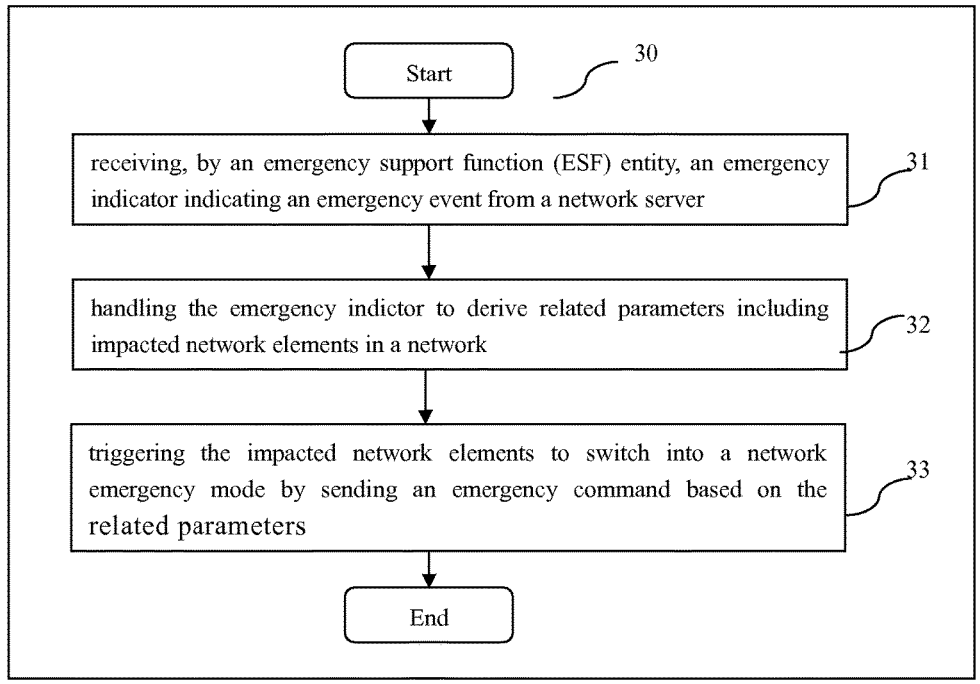
FIG. 3 illustrates an exemplary schematic flowchart of a method for emergency handling in a network according to an embodiment of the invention.

FIG. 3 illustrates an exemplary schematic flowchart of a method 30 for emergency handling in a network according to an embodiment of the invention.

In this method, when an emergency support function (ESF) entity receives, in step 31, an emergency indicator indicating an emergency event, e.g., earthquake, from an OSS device or an authorized $3^{rd}$ party device, in step 32, the emergency support function (ESF) entity handles the emergency indictor to derive the impacted network elements in a network within the emergency area and related parameters. The definition of the emergency indicator is described in the table 1 as above. Then, in step 33, the emergency support function (ESF) entity triggers the impacted network elements to switch into the network emergency mode by sending an emergency command to each of the impacted network elements based on the related parameters.

The network emergency mode may be triggered by one/ more entities, including OSS, $3^{rd}$ party or their combination via the ESF entity deployed in the network. Security of authentication of $3^{rd}$ party is necessary, for example, via source IP check, etc.

Figure 4:
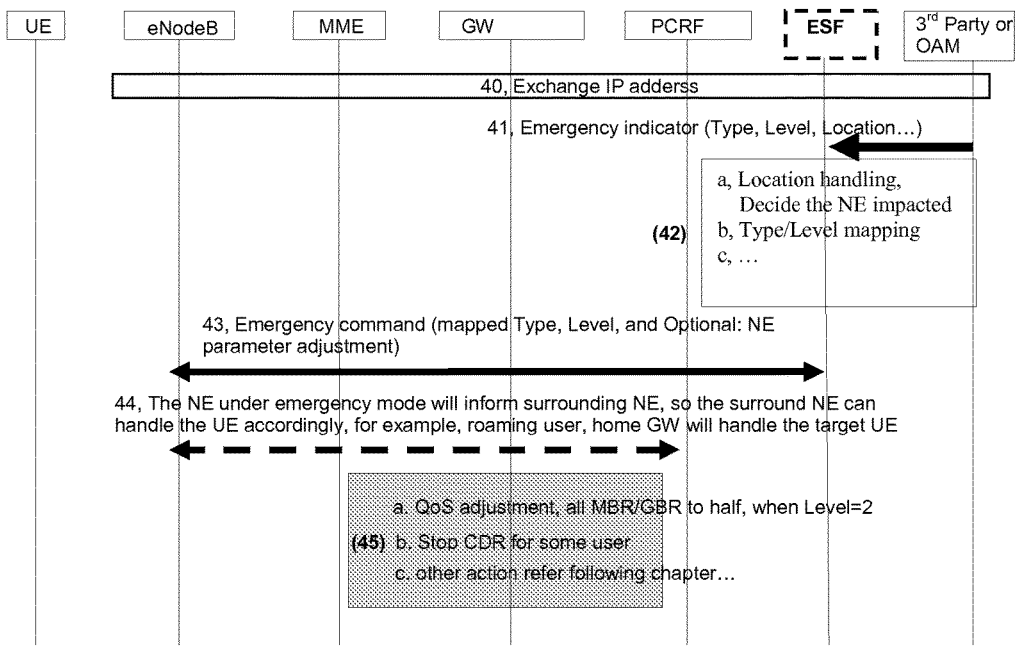
FIG. 4 illustrates an exemplary schematic signaling flowchart of a method for emergency handling in a network according to an embodiment of the invention.

FIG. 4 illustrates an exemplary schematic signaling flowchart of a method for emergency handling in a network according to an embodiment of the invention.

It is to be noted that all the following signaling messages may be transmitted over Transfer Control Protocol (TCP), User Datagram Protocol (UDP), Diameter, Stream Control Transmission Protocol (SCTP), or GPRS Tunneling Protocol (GTP) etc.

In the embodiment, in Step 40, the ESF entity need know the address of each NE. Alternatively or additionally, all NE addresses may be pre-configured in the ESF entity, and/or the address of the ESF entity may also be pre-configured in each NE.

In Step 41, a $3^{rd}$ party application server may send an "emergency indicator" to the ESF entity when some public emergency situation happens (preparing for the emergency is also allowed).

In the "emergency indicator", it may contain the information of command type "create/modify/cancel", location, emergency type, emergency level, special user list (MSISDN/IMSI list) or the combination of them.

In Step 42, the ESF entity may handle the "emergency indicator". For example, for the command type "Create", it may be described as including at least the following acts:
a) Location handling: the ESF entity may derive the affected NEs based on the location information contained in "emergency indicator";
b) Type/level mapping: the ESF entity may define different levels, actions, or other parameter for different affected NEs.

In Step 43, the ESF entity may send an "emergency command" to each affected NE. The emergency command may include information such as mapped emergency type, emergency level, and optional NE parameter adjustment, etc.

In step 44, alternatively or additionally, the affected NE under emergency mode may inform a surrounding NE, so the surround NE may handle the relevant UEs (e.g., roaming users) accordingly, for example, the surrounding network element (e.g., eNB) may increase radio coverage. In another example, home GW may handle the target UEs in affected NE.

In Step 45, each affected NE enforces the emergency command.

In one example, QoS adjustment may be performed, e.g., all Maximum Bit Rate (MBR) or Guaranteed Bit Rate (GBR) may be adjusted to half when emergency level=2; or adjusted to ⅔ when emergency level=3. All bears which have MBR may be decreased to ⅔ of legacy amount. Alternatively or additionally, Call Data Record (CDR) may be disabled for some users. According to the embodiment, adjusting MBRs of a majority of UEs need NOT extra messages, this will save lots of signaling in this scenario.

In another example, some other feature, e.g. UE signaling function may be activated automatically. This may also advantageously save lots of signaling. Particularly, functions related to UE signaling reduction may be activated automatically even if, in the network, the related license or switch control are not granted. One example of how UE signaling reduction works is that, for the mis-behaved UE, or UE not following 3GPP standardized behavior, the network has the option to ignore any incoming request messages from the UE.

Another example is location service. This license feature can be open, so network can launch this function for some UE even Operator of the network does not buy the license.

Alternatively or additionally, MME may use piggyback method, which means inserting emergency information, including adjusted UE related parameter, for example QoS, to inform UE the change of QoS in any legacy Non-Access Stratum (NAS) signaling.

The behavior in the network emergency mode may be described in detail hereinafter.

In the emergency situation, the traffic model is changing dramatically, e.g. earthquake, it requires UEs connecting each other in shorter time, and less interaction among the telecom nodes. Thus, the network (i.e., NEs) needs to go into emergency mode to meet the following countermeasures: A. increase network capacity; B. decrease network load; and C. fair usage of the network resource.

A. Increase Network Capacity

1) Increase the Coverage

The ESF entity may initiate the network element, e.g. eNB, to activate a pre-defined emergency configuration set to increase the capacity or coverage, such as increasing emission of radio.

The basic role is to ensure accessibility or capacity base on emergency requirement. The configuration set includes, but not limited to Admission Control, Load Control, Congestion Control, Channel Configuration, etc.

E.g. some of the eNBs break in emergency. To increase radio coverage using remain eNBs, a pre-defined Physical Random Access Channel (PRACH) preamble Format 0~3 may be reset to, or the power emission may be increased temporarily to provide different cell radius, for example, from 15 km to 100 km in such emergency situation.

Alternatively or additionally, non-emergency area cells which are adjacent to the emergency area may absorb UEs in the emergency area, to increase capacity. For UEs in IDLE mode, in the emergency configuration set, the SIB (System information Blocks) contents may be changed, to set proper values for cell selection and reselection related parameters, so that UEs may easily camp on non-emergency cells in those overlapping area. For the UEs in connect mode, neighbour cell configuration can be a part of the emergency configuration set. For example, by deleting neighbor cells which are inside the emergency area, the connected UEs may not perform handover into the emergency area.

2) Eliminate Access License Limitation

For example, in emergency, access license limitation may be eliminated temporarily according to the emergency level; in other words, the node capability license may be disabled according to e.g. the emergency level.

3) Open Location Feature Automatically for the Users in the Emergency Area

For example, according to indication from the ESF entity, the emergency area will be analyzed as RAs/LAs/TAs, for UEs in these areas, the network will automatically open location feature for them. Regardless of emergency level, location feature will be opened. The location of UEs in the emergency area may be captured and uploaded to some location server for latter usage.

B. Decrease Network Load

1) Disable Paging for Low Priority Dedicated Bears

For example, generally, default bearers of the IMS PDN connection provide IMS signaling. This is very important in emergency situation, and we need to keep those default bearers unchanged. Paging in the network may consume much radio resource. It may reserve the network resource significantly if paging for other low priority dedicated bears are disabled, i.e., if UE is in idle state, downlink traffic of partial/all low priority dedicated bearers will not trigger paging.

2) QoS Self-Adjustment

Figure 5:
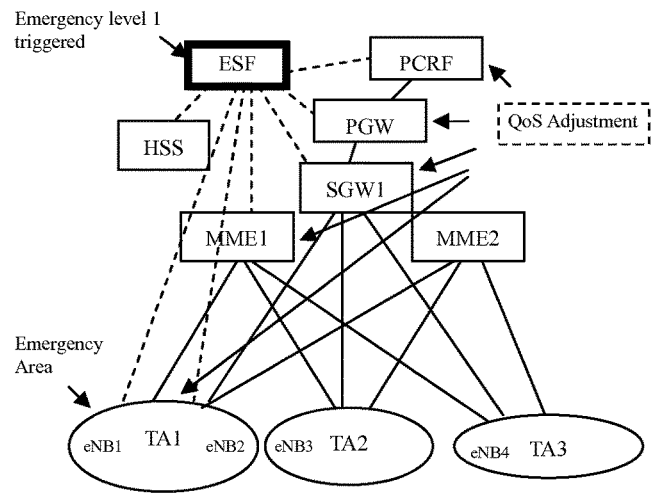
FIG. 5 illustrates an exemplary schematic diagram of QoS self-adjustment in network emergency mode according to an embodiment of the invention.

FIG. 5 illustrates an exemplary schematic diagram of QoS self-adjustment in network emergency mode according to an embodiment of the invention.

In the emergency area, services which have high authorized QoS may be adjusted to a certain low QoS level, depending on emergency level, to increase network capacity for new access requests. New access requests may be authorized a certain QoS level, depending on emergency level. The aim is to retain user basic service requirements (e.g., IP Multimedia Subsystem (IMS) service) and not occupy extra network resource.

In order not to introduce additional signaling for QoS modification, the QoS adjustment level in emergency may be pre-defined in all the relevant network elements (i.e., PCRF, Policy and Charging Enforcement Function (PCEF), PGW/SGW, SGSN-MME, eNB, etc). Once the network emergency mode is triggered, the emergency level is distributed among all the network elements, the QoS adjustment may be done immediately.

Alternatively or additionally, as shown in FIG. 5, the emergency area includes eNB 1, eNB 2, TA1, for all the UEs in the emergency area, depending on the emergency level (e.g., emergency level=1), following QoS adjustment may be performed, e.g., QoS MBR higher than 2 Mbps may be downgraded to 2 Mbps, QoS GBR higher than 128 kbps may be downgraded to 128 kbps. Alternatively or additionally, for all new access requests in the emergency area, depending on the emergency level, authorized QoS may be limited no higher than 2 Mbps for non-GBR bearers, 128 kbps for GBR bearers.

It is to be noted that the QoS adjustment depends on emergency levels. For example, the QoS of PDN connection on the IMS APN shall be guaranteed. Generally the QoS of voice bearer shall be kept unchanged during the emergency period. In the most serious emergency situation, the QoS of voice bearer may be downgraded to the lowest level but the bearer shall be able to afford very basic IMS voice service.

3) Procedures Simplification

Various procedures in communication systems are complex. It is reasonable regarding availability, integrity, confidentiality in normal cases, even though it takes time. However, when emergency event happens, e.g. earthquake, it requires UEs connecting each other in shorter time, and less interaction among the telecom nodes. The usable resource shall be utilized maximally.

Therefore, procedure simplification may be applied in emergency to assure the minimum requirement of communication, e.g. phone conversation.

Figure 6:
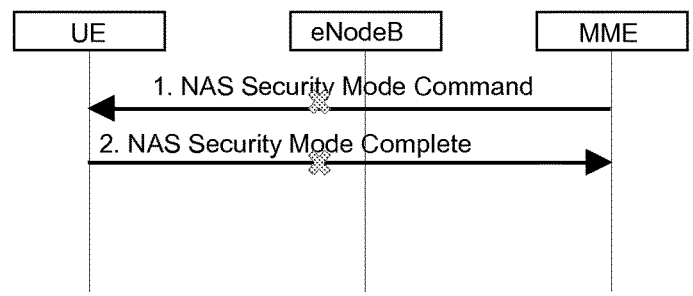
FIG. 6 illustrates an exemplary schematic diagram of authentication procedure simplification in LTE network according to an embodiment of the invention.

In one embodiment, as shown in FIG. 6, the authentication procedure may be simplified temporarily in emergency. For example, in emergency, the following messages in the LTE authentication procedure may not be sent, e.g., Message 1 (e.g., NAS Security Mode Command) from MME to UE, and Message 2 (e.g., the NAS Security Mode Complete) from UE to MME.

Alternatively or additionally, for a new UE executing the attach procedure, ciphering level may be set to 0 (i.e., no ciphering). The attached UE may keep the current status.

Figure 7:
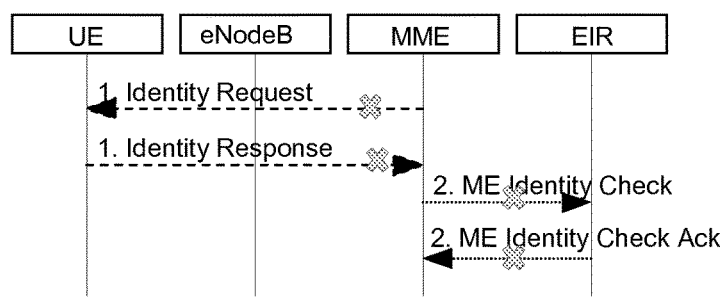
FIG. 7 illustrates an exemplary schematic diagram of disabling IMEI check procedure according to an embodiment of the invention.

Alternatively or additionally, International Mobile Equipment Identity number (IMEI) check procedure may be disabled, as shown in FIG. 7, the messages between MME and Equipment Identity Register (EIR) may be omitted, e.g., the ME Identity Check message and the ME Identity Check Ack message.

Figure 8:
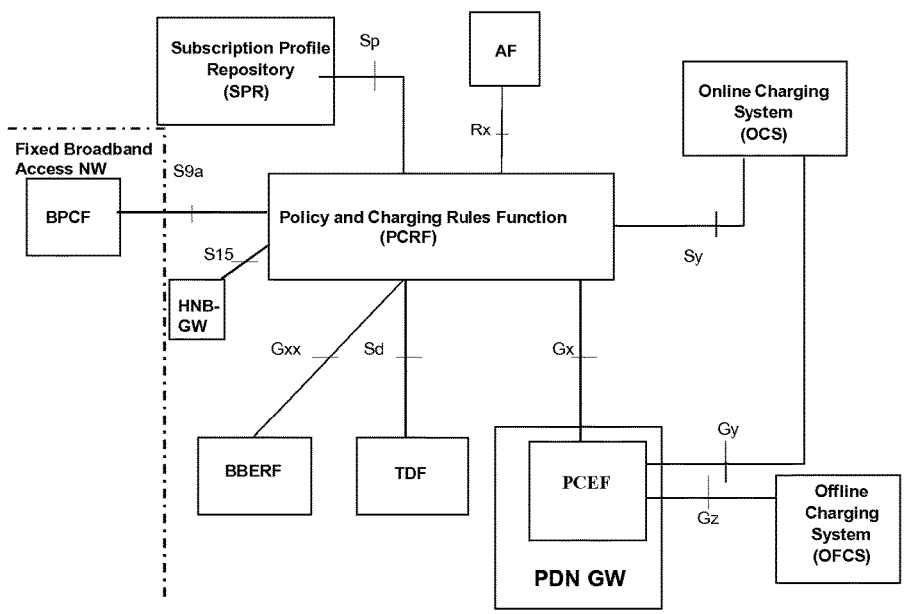
FIG. 8 illustrates an exemplary schematic diagram of disabling DPI functionality according to emergency level in an embodiment of the invention.

Alternatively or additionally, as shown in FIG. 8, policy control in $G_x$ interface may be adjusted according to emergency level. E.g., QoS may be handled following the strategy described above. According to emergency level, online charging in $G_y$ interface may also be adjusted. E.g., quota function may not be applied during emergency. According to emergency level, CDR Generation and communication for offline charging in Gz interface may further be adjusted.

As shown in FIG. 8, alternatively or additionally, most part of policy control and charging functionalities may be disabled, or, Deep Packet Inspection (DPI) functionality may be disabled according to emergency level.

C. Fair Usage of Network Resource

Figure 9:
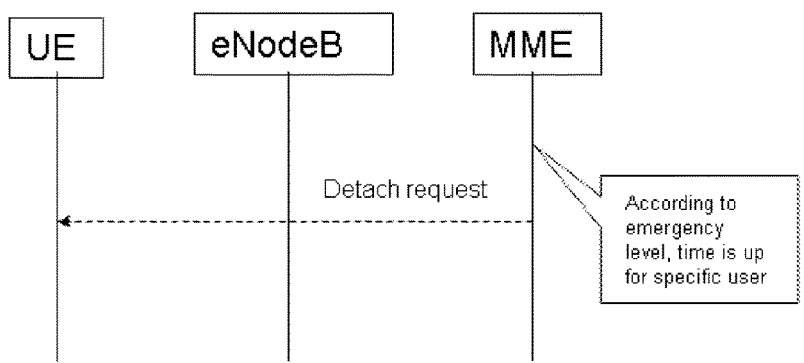
FIG. 9 illustrates an exemplary schematic diagram of adjusting duration of connection according to emergency level in an embodiment of the invention.

Alternatively or additionally, according to emergency level, different duration of connection may be allowed for users. For example, for the lowest emergency level, it may allow 30-min connection for one user; while for the highest emergency level, it may allow 3-min connection at most for one user. Specifically, as shown in FIG. 9, according to emergency level, when time is up for some specific user, the network may actively close the connection for this user and release the related resource, e.g., MME sends a Detach request to the specific UE. For example, according to emergency level, this message may be initiated to some user considering equality when the network load stays high level for amount of time. Gateway (GW) may launch a similar deactivate procedure for the same reason.

Figure 10:
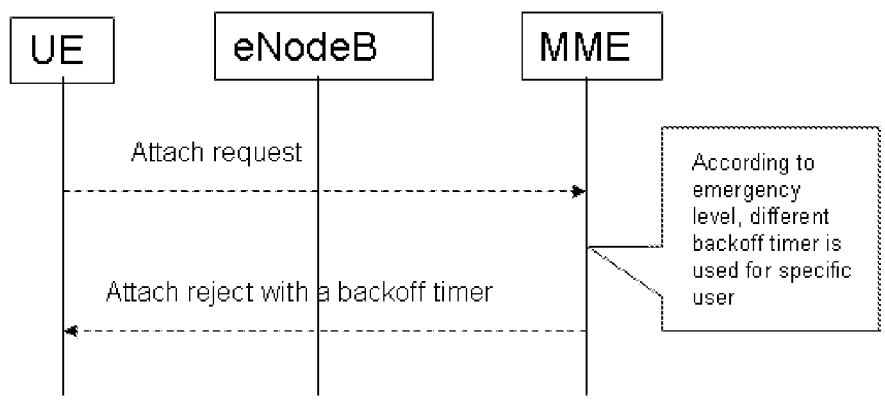
FIG. 10 illustrates an exemplary schematic diagram of adjusting re-attach times according to emergency level in an embodiment of the invention.

Alternatively or additionally, according to emergency level, different times of re-attach in a period after attach failure may be allowed. For example, for the lowest emergency level, 10 seconds of back off timer may be set for one user, which means retry times are 6 times per minute; while for the highest emergency level, back off timer may be set to 5 minutes (300 seconds), which means retry times are 12 times per hour. For example, as shown in FIG. 10, when an attach request sent from a specific UE is rejected by the network due to network capacity reason, a specific back off timer value may be sent back to the user in the location update reject response to UE.

For privileged users, fair usage function may not work for them. IMSI of these privileged users may be notified in advance from the ESF entity to NEs, such as, SGSN, MME, eNB, GW, PCRF.

It will be appreciated that the above description for clarity has described the embodiments with reference to different functional units/modules, processors, and servers. However, it will be apparent that any suitable distribution of functionality between different functional units/modules, processors or servers may be used without detracting from the invention. For example, functionality illustrated to be performed by separate modules, processors or servers may be performed by the same module, processor or server. Hence, references to specific functional units/modules or servers are only to be seen as references to suitable means for providing the described functionality rather than indicative of a strict logical or physical structure or organization.

Although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. Reference signs in the claims are provided merely as a clarifying example shall not be construed as limiting the scope of the claims in any way.

The terminology used herein is for the purpose of describing particular embodiments only and is not intended to limit to the invention. As used herein, the singular forms "a", "an" and "the" are intended to include the plural forms as well, unless otherwise stated. It will be further understood that the terms "including", "comprising" and conjugation thereof when used herein, specify the presence of stated features, integers, steps, operations, elements, and/or components, but do not preclude the presence or addition of one or more other features, integers, steps, operations, elements, components, and/or groups thereof.

Although the invention has been particularly shown and described with reference to exemplary embodiments thereof, it will be understood by those skilled in the art that various changes in form and details may be made without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims.

The invention claimed is:

1. An emergency handling method, comprising:
receiving, by an emergency support function (ESF) entity, an emergency indicator indicating an emergency event from a network application server;
determining a set of affected network elements in a network affected by the emergency event;
for each affected network element included in said set of affected network elements, selecting an emergency level; and
for each affected network element included in said set of affected network elements, triggering the affected network element to switch into a network emergency mode by sending an emergency command to the affected network element,
wherein the emergency command sent to the affected network element comprises: an emergency type identifier identifying an emergency type associated with the indicated emergency event and emergency level information identifying the selected emergency level for the affected network element, and
wherein switching into the network emergency mode comprises disabling all or partial policy control and charging functionalities provided by at least one of the affected network elements according to the selected emergency level.

2. The method according to claim 1, wherein switching into a network emergency mode comprises at least one of increasing network capacity, decreasing network load, and fair usage of network resource.

3. The method according to claim 1, further comprising: configuring all network element addresses in the ESF entity and configuring ESF entity addresses in all network elements.

4. The method according to claim 1, further comprising: deriving affected network elements based on location information contained in the emergency indicator, and defining different emergency configuration parameters for different network elements.

5. The method according to claim 1, further comprising: informing, by the ESF entity, surrounding network elements in a non-emergency area of the emergency so that the surrounding network elements adjust parameters for the related user equipment (UE), wherein the surrounding network elements increase radio coverage.

6. The method according to claim 1, further comprising: enforcing the emergency command for switching into a network emergency mode by each of the affected network elements.

7. The method according to claim 1, wherein the emergency indicator includes information containing at least one of command type, emergency location, emergency type, emergency level, and emergency action.

8. The method according to claim 1, wherein switching into a network emergency mode comprises:
initiating, the ESF entity, the network elements to activate a pre-defined emergency configuration set to increase capacity or coverage, wherein the configuration set includes at least one of QoS control, admission control, load control, congestion control, activate features, disable features, radio coverage adjustment, and channel configuration.

9. The method according to claim 8, wherein activating a pre-defined emergency configuration set comprises:
modifying System Information Blocks to set proper values for cell selection and reselection related parameters for a User Equipment (UE) in an overlapping area to camp on a cell under non-emergency mode.

10. The method according to claim 8, wherein activating a pre-defined emergency configuration set comprises:
setting a pre-defined Physical Random Access Channel (PRACH) preamble format to provide a larger coverage according to the emergency level.

11. The method according to claim 1, wherein switching into a network emergency mode comprises:
eliminating access license limitation to the network elements.

12. The method according to claim 1, wherein switching into a network emergency mode comprises:
opening automatically a location feature for all or partial UEs in emergency area.

13. The method according to claim 1, wherein switching into a network emergency mode comprises:
disabling paging for all or partial dedicated bearers.

14. The method according to claim 1, wherein switching into a network emergency mode comprises:
adjusting a high authorized QoS level to a certain low level or authorizing a certain QoS level to a new access request depending on the emergency level.

15. The method according to claim 1, wherein switching into a network emergency mode comprises:
pre-defining a QoS adjustment level in a relevant network element.

16. The method according to claim 1, wherein switching into a network emergency mode comprises:
simplifying temporarily some communication interaction procedures among communication nodes.

17. The method according to claim 1, wherein switching into a network emergency mode comprises:
deactivating all or partial call data record, CDR, generation and communication according to the emergency level.

18. The method according to claim 1, wherein switching into a network emergency mode comprises:
adjusting a duration of connection for a User Equipment (UE) and times of re-attach in a period after attach failure according to the emergency level.

19. The method according to claim 1, further comprising:
using a piggyback method to inform a User Equipment (UE) in any Non-Access Stratum signaling.

20. An emergency handling apparatus in a network, comprising:
a memory;
a receiver; and
a processor coupled to the memory, wherein the processor is configured to:
employ the receiver to obtain an emergency indicator indicating an emergency event;
determine a set of affected network elements in a network affected by the emergency event;
for each affected network element included in said set of affected network elements, select an emergency level; and
for each affected network element included in said set of affected network elements, trigger the affected network element to switch into a network emergency mode by sending an emergency command to the affected network element,
wherein the emergency command sent to the affected network element comprises: an emergency type identifier identifying an emergency type associated with the indicated emergency event and emergency level information identifying the selected emergency level for the affected network element, and
wherein switching into the network emergency mode comprises disabling all or partial policy control and charging functionalities provided by at least one of the affected network elements according to the selected emergency level.

21. The apparatus according to claim 20, wherein the processor is further configured to;
configure all network element addresses in the apparatus and configure an apparatus address in all network elements.

22. The apparatus according to claim 20, wherein the processor is further configured to derive affected network elements based on location information contained in the emergency indicator; and define different emergency configuration parameters for different network elements.

23. A device comprising an emergency support function, ESF, entity, wherein the ESF is configured to:
employ a receiver to obtain an emergency indicator indicating an emergency event;
determine a set of affected network elements in a network affected by the emergency event;

for each affected network element included in said set of affected network elements, select an emergency level; and for each affected network element included in said set of affected network elements, trigger the affected network element to switch into a network emergency mode by sending an emergency command to the affected network element, wherein the emergency command sent to the affected network element comprises: an emergency type identifier identifying an emergency type associated with the indicated emergency event and emergency level information identifying the selected emergency level for the affected network element, and wherein switching into the network emergency mode comprises disabling all or partial policy control and charging functionalities provided by at least one of the affected network elements according to the selected emergency level.

* * * * *